E. J. WIGGINS AND E. S. HEBELER.
ALTERNATING CURRENT ARC WELDING APPARATUS.
APPLICATION FILED JUNE 20, 1919.
1,411,394.
Patented Apr. 4, 1922.
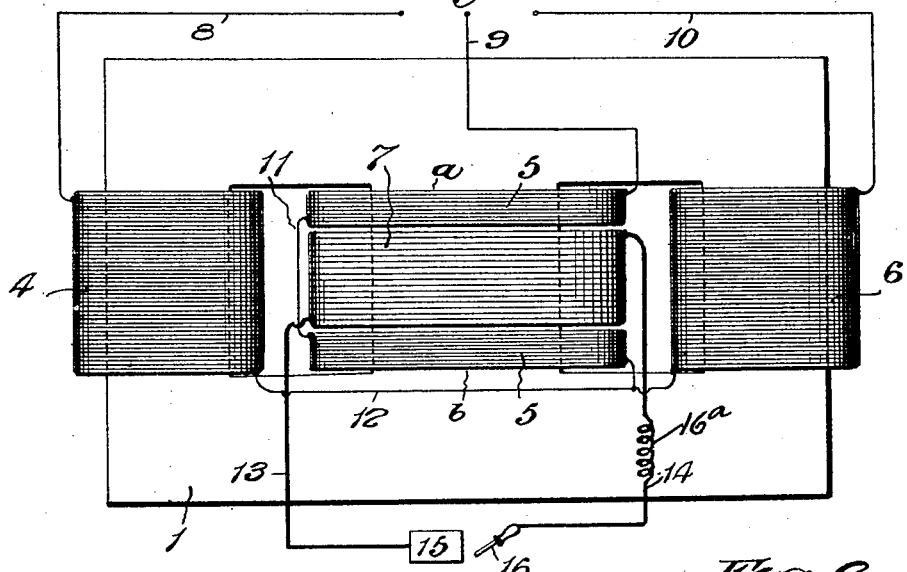
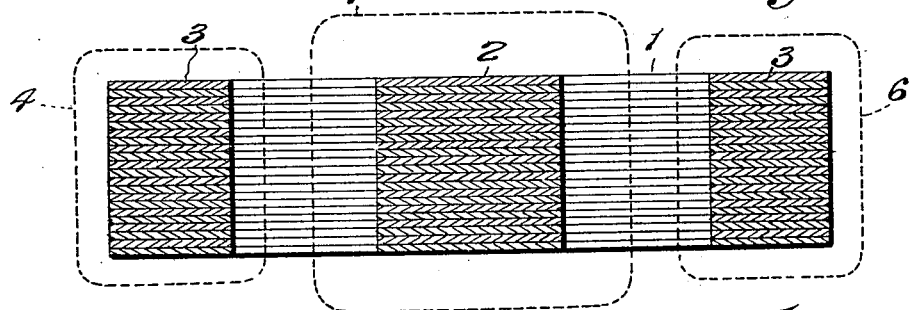
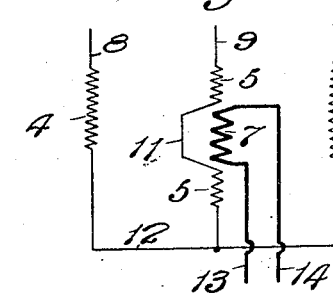
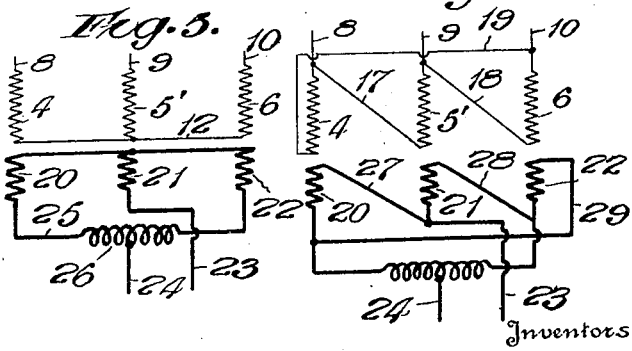
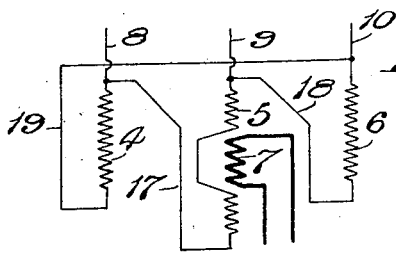

UNITED STATES PATENT OFFICE.

EDWARD J. WIGGINS, OF BUFFALO, AND EDWARD S. HEBELER, OF WILLIAMSVILLE, NEW YORK, ASSIGNORS TO FREDERICK W. ALLAN, OF BUFFALO, NEW YORK.

ALTERNATING-CURRENT ARC-WELDING APPARATUS.

1,411,394.   Specification of Letters Patent.   Patented Apr. 4, 1922.

Application filed June 20, 1919. Serial No. 305,688.

*To all whom it may concern:*

Be it known that we, EDWARD J. WIGGINS and EDWARD S. HEBELER, citizens of the United States, and residing at Buffalo and Williamsville, respectively, in the county of Erie and State of New York, have invented new and useful Improvements in Alternating-Current Arc-Welding Apparatus, of which the following is a specification.

This invention relates to alternating current electric welding apparatus, and more particularly to apparatus of this character comprising a static transformer for converting polyphase into single phase currents.

Distribution of current from power generating stations is usually made by means of three-phase alternating current, of comparatively high voltage. When it is therefore desired to secure a comparatively low voltage current for use in electric welding or other single phase circuits it is necessary to use either a static transformer or a rotary converter or motor generator. Power companies, however, do not usually permit the use of a static transformer on one phase of a three-phase circuit, as this tends to unbalance the line. A rotary converter or motor generator set being comparatively expensive and costly to operate are not satisfactory commercially for use in connection with electric welding or other work circuits consuming a relatively small amount of power.

It is the object of the present invention therefore to provide a static transformer having primary windings connected with a plurality of phases of the power supply line, and a single secondary winding especially arranged for supplying current efficiently to an electric welding circuit requiring only single phase current. By this means the use of machines with moving parts is obviated, and a much better balancing of the line secured than where an ordinary single phase transformer is employed.

In order that the invention may be readily understood, reference is had to the accompanying drawings forming a part of this specification, and in which:—

Figure 1 is a side elevation illustrating more or less conventionally our improved electric welding apparatus comprising a polyphase-single phase transformer, and showing the arrangement of primary and secondary coils thereon;

Figure 2 is a central horizontal section through the transformer shown in Figure 1, the coils being indicated by dotted lines;

Figure 3 is a diagram illustrating the circuit connections embodied in the transformer shown in Figure 1, in which diagram the primary windings are shown as star connected;

Figure 4 is a view similar to Figure 3 but showing the primary windings as delta connected;

Figures 5 and 6 are similar diagrams illustrating star and delta connections, respectively, for a slightly modified arrangement of windings.

Referring to the drawings in detail, and more particularly to Figures 1 to 3 thereof, our improved apparatus includes a transformer preferably of the so-called "shell" type. It comprises a suitable yoke 1, shown as rectangular and having three parallel branches or legs, the middle branch being designated at 2 and the outer branches at 3. It will be understood that this yoke is built up of suitable laminations of soft iron as usual in transformer constructions, and as illustrated in Figure 2.

Three primary windings or coils are preferably employed, and these are shown at 4, 5 and 6, one of these coils being wound around each of the legs of the yoke. One end of the coils is connected with leads 8, 9 and 10 which extend to the power circuit, and the other ends of the coils are connected to a common conductor 12, thus constituting a star connected primary, as indicated in Figure 3.

The middle coil 5 of the primary winding is preferably divided into two sections $a$ and $b$, spaced apart and connected by means of a conductor 11, and interposed between these two sections is a single secondary coil or winding 7. The terminals of this secondary coil 7 are attached to leads 13 and 14 connected with electric welding elements comprising a plate or other article 15 and an electrode 16, a current limiting device such as a choke coil 16$^a$ being preferably included in the circuit to steady the arc, and prevent excessive flow of current on short-circuit. While we have specifically mentioned "welding," it will of course be understood that our improved apparatus is equally applicable for arc cutting or repairing by the electric deposition of metal from the electrode, as is well known.

It will be particularly noted that the work circuit is normally open, and that no current flows in the secondary coil 7 except when current is being drawn from the leads 13 and 14. It will be seen that the yoke provides a plurality of closed magnetic paths, and that the secondary coil, being wound around the central branch or leg of the yoke, is so located as to be influenced by the combined flux generated by the three primary coils 4, 5 and 6, so that each of these coils contributes to the production of the current used in the work circuit, connected with the secondary coil, thereby tending to balance the load on the three phases of the power line. Figure 4 shows how the windings illustrated in Figure 1 can be connected in delta, the ends of the coils 4, 5 and 6 being joined by means of conductors 17, 18 and 19.

Figure 5 illustrates a slightly modified arrangement of transformer windings, in which a plurality of secondary coils are employed. In this figure the primary windings are shown as star connected, and are indicated at 4, 5' and 6. Three secondary windings 20, 21 and 22 are employed and are also shown as being star connected. 23 and 24 designate the leads of the single phase secondary or work circuit, the lead 23 being connected with the free end of one of the windings, such as 21, and the lead 24 being connected to the middle point of an inductance coil 26 interposed in a conductor 25 connecting the ends of the coils 20 and 22. It will be noted that in this modification also the work circuit is normally open, and that no current flows in the secondary winding 21 except when being drawn from the leads 23 and 24.

In Figure 6 we have shown how the windings illustrated in Figure 5 can be delta connected. The primary windings 4, 5' and 6 are united by means of conductors 17, 18 and 19 as in Figure 4, while the secondary windings are united by conductors 27, 28 and 29, the leads 23 and 24 being tapped from the winding 21 and the middle point of an inductance joining the windings 20 and 22 as in Figure 5. In the modifications shown in Figures 5 and 6 it will also be noted that all of the primary windings cooperate in inducing current in the single secondary or work circuit.

It will be understood, of course, that suitable taps may be arranged on the secondary winding 7 in Figure 1, so as to give different desired voltages in the work circuit.

What we claim is:

1. Apparatus utilizing polyphase alternating current for metallic arc welding, cutting or repairing by means of a single electrode in addition to the work, including a static transformer for converting polyphase into single phase currents, said transformer comprising a magnetizable member having a plurality of completely closed magnetic paths, a plurality of primary coils wound thereon, and connected with the polyphase circuit, and a single secondary coil also wound on said member and disposed to embrace the flux traversing a plurality of said magnetic paths, said secondary coil being connected in a circuit including the arc welding, cutting or repairing electrode and the work.

2. Apparatus utilizing polyphase alternating current for metallic arc welding, cutting or repairing by means of a single electrode in addition to the work, including a static transformer for converting polyphase into single phase currents, said transformer comprising a magnetizable member having a number of parallel branches, each branch forming part of a completely closed magnetic path, a polyphase primary circuit comprising windings on a plurality of said branches, and a secondary or work circuit comprising a single coil wound on one of said branches, the terminals of said work circuit being connected to the arc welding, cutting or repairing electrode and to the work to be welded, cut or repaired.

3. Apparatus utilizing polyphase alternating current for metallic arc welding, cutting or repairing by means of a single electrode in addition to the work, including a static transformer for converting polyphase into single phase currents, said transformer comprising a magnetizable member having a number of parallel branches, each branch forming part of a completely closed magnetic path, a polyphase primary circuit comprising a winding on each of said branches, and a single phase secondary circuit comprising a coil wound on one of said branches, the terminals of said secondary circuit being connected to the arc welding, cutting or repairing electrode and to the work to be welded, cut or repaired, respectively.

4. An alternating current system for utilizing polyphase currents for electric arc welding, cutting or repairing comprising a work circuit having a single pair of electrodes, the material to be welded, cut or repaired constituting one electrode, and the welding, cutting or repairing material constituting the opposite electrode, a transformer for supplying single phase current to said work circuit and having a magnetizable core shaped to provide a plurality of completely closed flux paths, a plurality of primary windings on said core and connected with the polyphase circuit, and a single secondary winding on said core and connected in said work circuit.

EDWARD J. WIGGINS.
EDWARD S. HEBELER.